United States Patent
Bragin et al.

(10) Patent No.: US 6,466,599 B1
(45) Date of Patent: Oct. 15, 2002

(54) DISCHARGE UNIT FOR A HIGH REPETITION RATE EXCIMER OR MOLECULAR FLUORINE LASER

(75) Inventors: Igor Bragin, Göttingen (DE); Vadim Berger, Göttingen (DE); Uwe Stamm, Göttingen (DE); Ulrich Rebhan, Göttingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/453,670

(22) Filed: Dec. 3, 1999

Related U.S. Application Data
(60) Provisional application No. 60/128,227, filed on Apr. 7, 1999.

(51) Int. Cl.[7] .............................................. H01S 3/225
(52) U.S. Cl. ........................................... 372/58; 372/57
(58) Field of Search ................................ 372/55.57, 58

(56) References Cited

U.S. PATENT DOCUMENTS

| | | | |
|---|---|---|---|
| 4,686,682 A | 8/1987 | Haruta et al. | 372/87 |
| 4,802,185 A | 1/1989 | Kyusho | 372/86 |
| 4,891,818 A | 1/1990 | Levatter | 372/57 |

(List continued on next page.)

FOREIGN PATENT DOCUMENTS

| | | | | |
|---|---|---|---|---|
| DE | 44 01 892 A1 | 7/1996 | | H01S/3/038 |
| EP | 1 075 059 A1 | 2/2001 | | H01S/3/0971 |
| EP | 1 107 401 A1 | 6/2001 | | H01S/3/038 |

OTHER PUBLICATIONS

T.Y. Chang, "Improved Uniform–Field Electrode Profiles for TEA Laser and High–Voltage Applications," *The Review of Scientific Instruments*, Apr. 1973, vol. 4, No. 4, pp. 405–407.

G.J. Ernst, "Uniform–Field Electrodes with Minimum Width," *Optics Communications*, Mar. 15, 1984, vol. 49, No. 4, pp. 275–277.

G.J. Ernst, "Compact Uniform Field Electrode Profiles," *Optics Communications*, Aug. 1, 1983, vol. 47, No. 1, pp. 47–51.

E.A. Stappaerts, "A novel analytical design method for discharge laser electrode profiles," *Appl. Phys. Lett.*, Jun. 1982, vol. 40, No. 12, pp. 1018–1019.

V.M. Borisov et al., "Effects limiting the average power of compact pulse–periodic KrF lasers," *Quantum Electronics*, 1995, vol. 25, No. 5, pp. 421–425.

Industrial Excimer Lasers. Fundamentals, Technology and Maintenance, Editor Dr. D. Basting (Lambda Physik GmbH, Goettingen, Germany), 2nd Edition, 1996.

*Primary Examiner*—Paul Ip
*Assistant Examiner*—James Menefee
(74) *Attorney, Agent, or Firm*—Sierra Patent Group, Ltd.; Andrew V. Smith (57) ABSTRACT

A laser for an excimer or molecular fluorine laser includes an electrode chamber connected with a gas flow vessel and having a pair of main electrodes and a preionization unit each connected to a discharge circuit. A spoiler is provided within the electrode chamber and is shaped to provide a more uniform gas flow through the discharge area between the main electrodes, to shield one of the preionization units from one of the main electrodes, and to reflect acoustic waves generated in the discharge area into the gas flow vessel for absorption therein. A spoiler unit may include a pair of opposed spoiler elements on either side of the discharge area. One or both main electrodes includes a base portion and a center portion which may be a nipple protruding from the base portion. The center portion substantially carries the periodic discharge current such that the discharge width is and may be significantly less than the width of the base portion. The curvatures of both main electrodes may conform to the curvature of the gas flow through the discharge chamber to further improve aerodynamic performance. A plurality of low inductive conducting ribs are connected to the grounded main electrode and shaped to provide a more uniform flow of gases through openings defined between adjacent ribs.

24 Claims, 7 Drawing Sheets

U.S. PATENT DOCUMENTS

| | | | | |
|---|---|---|---|---|
| 5,090,020 A | * | 2/1992 | Bedwell | 372/59 |
| 5,239,553 A | * | 8/1993 | Ono et al. | 372/58 |
| 5,247,534 A | | 9/1993 | Müller-Horsche | 372/58 |
| 5,255,282 A | * | 10/1993 | Remo | 372/82 |
| 5,535,233 A | | 7/1996 | Mizoguchi et al. | 372/87 |
| 5,557,629 A | | 9/1996 | Mizoguchi et al. | 372/87 |
| 5,586,134 A | | 12/1996 | Das et al. | 372/38 |
| 5,771,258 A | | 6/1998 | Morton et al. | 372/57 |
| 5,923,693 A | | 7/1999 | Ohmi et al. | 372/57 |
| 5,978,405 A | | 11/1999 | Juhasz et al. | 372/57 |
| 6,128,323 A | * | 10/2000 | Myers et al. | 372/38 |
| 6,183,359 B1 | | 2/2001 | Klein et al. | 454/307 |
| 6,212,211 B1 | | 4/2001 | Azzola et al. | 372/53 |

\* cited by examiner

DISCHARGE UNIT FOR A HIGH REPETITION RATE EXCIMER OR MOLECULAR FLUORINE LASER

PRIORITY

This patent application claims the benefit of priority to U.S. provisional patent application No. 60/128,227, filed Apr. 7, 1999.

BACKGROUND OF THE INVENTION

1. Field of the Invention

The present invention relates to a discharge unit for an excimer or molecular gas laser, particularly having a narrow discharge width and aerodynamic gas flow.

2. Discussion of the Related Art

Pulsed gas discharge lasers, emitting in the deep ultraviolet region (DUV) and/or vacuum ultraviolet region (VUV), are important tools for a wide range of industrial applications. For example, microlithography applications currently use a line narrowed excimer laser (e.g., ArF, KrF, XeCl, KrCl or XeF) or a molecular fluorine ($F_2$) laser having high efficiency and stability at high repetition rates (e.g., 1000 Hz or more).

Figure 1:
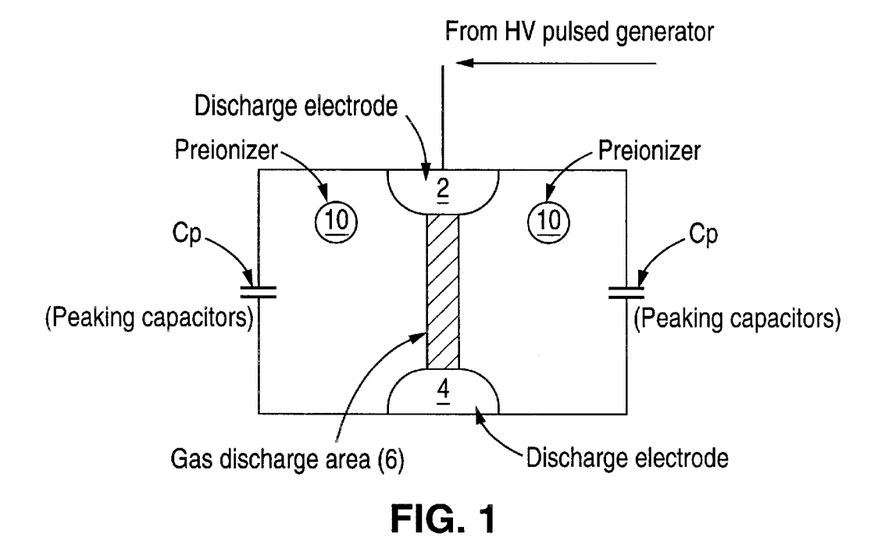
FIG. 1 illustrates in a cross sectional view an electrode chamber of a typical discharge unit design and electrode configuration.

An electrode chamber design and electrode configuration of a conventional discharge unit are illustrated in FIG. 1. The electrode chamber of FIG. 1 houses a pair of elongated main electrodes 2, 4. The main electrodes 2, 4 are separated by a gap or discharge area 6 through which a gas mixture is flowed. A set of high voltage capacitors or "peaking" capacitors Cp is preferably positioned as close as possible to the main discharge electrodes 2, 4, and as uniformly as possible over the length of the electrodes 2, 4. One or two or more preionization units 10 are used to preionize the gas mixture in the discharge area 6 prior to the main discharge.

One of the main electrodes, in this case electrode 2, is connected to a pulsed high voltage generator. The high voltage generator typically includes a thyratron or a solid state switch for providing a fast and powerful charge to the peaking capacitors 8 up to the electrical breakdown voltage of the gas discharge gap 6. The other main electrode 4 is usually connected to ground potential. Fast and powerful discharge of the peaking capacitors Cp, followed by electrical breakdown of the active laser gases in the gas mixture provides the necessary pumping of the gas mixture.

The peaking capacitors in both cases are disposed outside of the electrode chamber (that is not necessary, but common, because it easily avoids exposure of the peaking capacitors to the aggressive halogen gas). One of the main discharge electrodes, the ground electrode, is connected directly to the metal body of the electrode chamber. The other or high voltage electrode is connected to the peaking capacitors and is separated from the grounded metal body of the electrode chamber by means of a dielectric (e.g., ceramic) insulator.

The gas mixture is characterized as being strongly electronegative and maintained at an elevated pressure (e.g., a few bars). The gas mixture for an excimer laser includes an active rare gas such as krypton, argon or xenon, a halogen containing species such as fluorine or HCl, and a buffer gas such as neon or helium. A molecular fluorine laser includes molecular fluorine and a buffer gas such as neon and/or helium.

A typical preionization arrangement includes two preionization units 10 each including a conducting electrode inside a dielectric tube. The preionization units 10 are connected to a pulsed high voltage source and preionize the gas mixture by forming a uniform surface glow discharge. The preionization units 10 are typically positioned in the vicinity of the discharge area 6 between the main electrodes 2, 4 and provide an initial ionization of the laser gas during the charging of the peaking capacitors Cp by the high voltage pulsed generator. UV-preionizers typically include arrays of electrical sparks, sometimes stabilized by dielectric surfaces, or other configurations of barrier or corona discharge sources. Soft x-ray radiation sources are also sometimes used.

Figures 2A, 2B:
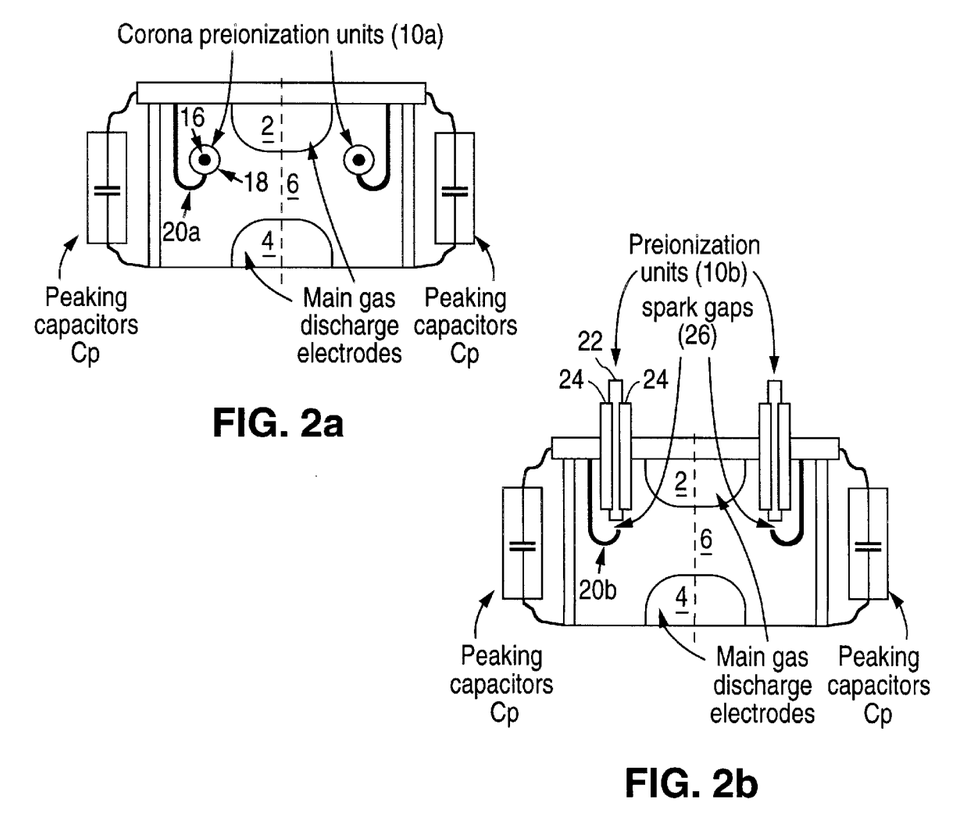
FIG. 2a illustrates in a cross section view a laser having an exemplary UV corona preionization unit design.
FIG. 2b illustrates in a cross sectional view a laser having an exemplary UV spark preionization unit design.

Examples of preionization arrangements which could be used for UV- preionization are shown in FIGS. 2a and 2b. FIG. 2a shows a corona preionization arrangement including two corona units 10a. Each corona unit 10a shown includes an cylindrical electrode 16 surrounded by a dielectric tube 18. An external electrode 20a provides a potential difference for each preionization unit 10a. The UV radiation emitted by the preionization units 10a preionizes gaseous components within the discharge area 6.

FIG. 2b shows a cross section of a UV-spark preionization arrangement wherein the preionization units 10b include separate pins 22 surrounded by dielectrics 24. These pins 22 are fed-through the chamber and connected to a pulsed power source outside the chamber. A plurality of spark gaps 26 are formed due to a potential difference between an electrode 20b in proximity to the pins 22 and produces preionization of the gas in the discharge area 6.

Figure 3:
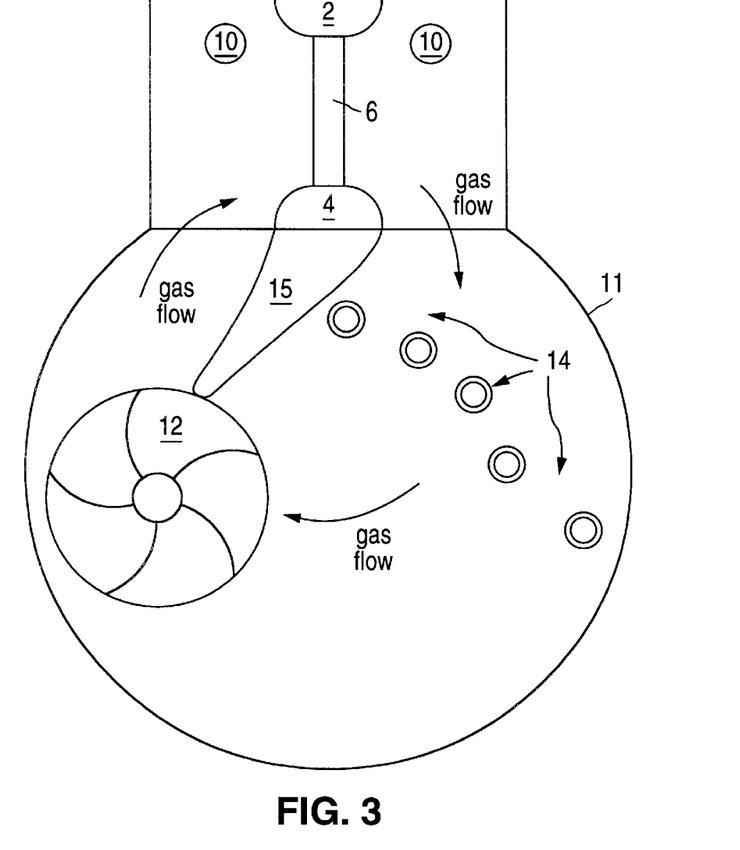
FIG. 3 illustrates in a cross sectional view a laser tube including an electrode chamber connected with a gas flow vessel.

Besides the discharge unit having a pulser circuit and a laser tube including an electrode chamber such as that illustrated in FIG. 1, the laser tube of the discharge unit further includes a gas vessel 11 having a gas flow system or blower 12 and a heat exchanger 14 as illustrated in FIG. 3. A vane 15 is also shown extending from the blower 12 generally to the electrode 4 of the discharge chamber. The blower 12 forces the gas to flow generally as indicated by the arrows in FIG. 3. The gas mixture is naturally heated as it is excited by the electrical discharge in the discharge area 6. The heat exchanger 14 cools the heated gas after it exits the electrode chamber. The portion of the gas mixture which participates in a laser pulse is replaced by fresh gas before the next laser pulse occurs. Although not shown, a gas supply unit also typically supplies fresh gas to the system from outside gas containers to replenish each of the components of the gas mixture. In particular, halogen containing gas is typically supplied because the halogen concentration in the gas mixture tends to deplete rapidly during operation, while it is desired to maintain a constant or near constant halogen concentration in the gas mixture. Means for releasing some of the gas mixture is also typically provided so that the gas pressure can be controlled and to expel contaminated gases.

Above, various components of a pulsed gas discharge laser such as an excimer or molecular laser have been discussed with respect to their design and arrangement within the electrode chamber. The design and placement of the electrode chamber itself relative to the gas vessel 11, the placement of the peaking capacitors Cp, and the insulation of the high voltage electrode 2 are further considerations in effective discharge unit design. Examples of laser designs are illustrated in cross-sectional views at the FIGS. 4a and 4b.

Figure 4A:
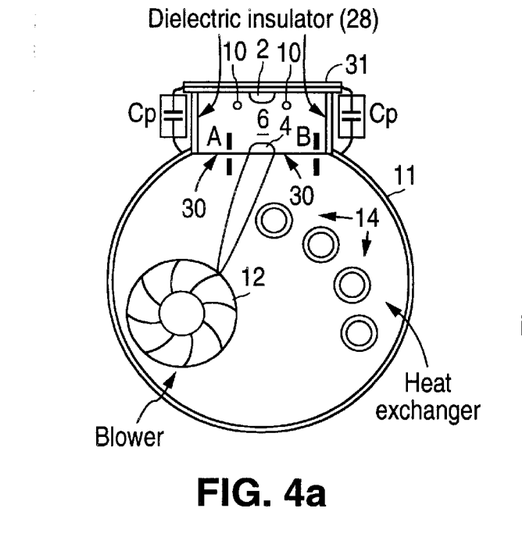
FIG. 4a illustrates in a cross section view a laser tube including an electrode chamber and a gas flow vessel, wherein the high voltage electrode is insulated by a dielectric insulator, and the discharge area is adjacent to the gas flow vessel.

The discharge unit illustrated at FIG. 4a includes a dielectric frame or one or two or more dielectric insulators 28 (see Industrial Excimer Lasers: Fundamentals, Technolgy and Maintenance, Dirk Basting, Ed., $2^{nd}$ edition (1991); Litho laser tube of Lambda Physik, GmbH). Each dielectric insulator 28 is mechanically connected to the gas vessel 11 that is connected to the grounded discharge electrode 4. The dielectric frame or insulator(s) 28 electrically isolate the high voltage electrode 2. That is, the roof 31 connected to the high voltage electrode 2 is insulated from the grounded main electrode 4 by the dielectric insulator(s) 28.

Where the electrode chamber, e.g., as shown in FIG. 4a, meets the gas vessel 11, an arrangement 30 of conducting ribs are connected electrically to the grounded electrode 4. The rib arrangement 30 of the discharge unit includes several rectangular ribs 32 separated by openings to permit gas flow from the gas vessel 11 into the electrode chamber and into the discharge area 6. The relationship between the rectangular ribs 32 and the opening separating them are illustrated at FIGS. 4c–4e. The ribs 32 serve as low inductive current conductors in the discharge circuitry. A lower inductivity of the discharge electrical current loop is advantageous as better matching may be provided between the wave impedance of the electrical discharge loop and the gas discharge impedance.

The discharge unit of FIG. 4a advantageously allows the discharge loop to exhibit a characteristically low inductivity. However, the gas flow through the discharge area 6, and especially near the grounded electrode 4, has a high curvature producing turbulences that complicate the gas exchange in the discharge area 6.

Another consideration arises with respect to the nearly rectangular interior shape of the electrode chamber. Powerful and symmetric energy dissipation in the gas discharge area 6, particularly when the system is operating at a high repetition rate, can lead to acoustical resonances and amplification of the level of standing acoustical waves. Modulation of the gas density by the acoustical disturbances can have an adverse influence on the uniformity of the gas discharge and ultimately on significant laser output parameters.

One way to reduce the level of these acoustical disturbances is to introduce acoustical dampers into the field of the acoustical waves. These dampers may be used as obstacles for the acoustical waves. However, the dampers can also have an adverse influence on the uniformity of the gas flow. In addition, the dampers would have large surface areas which are subject to attack by aggressive halogens in the gas mixture.

Figure 4B:
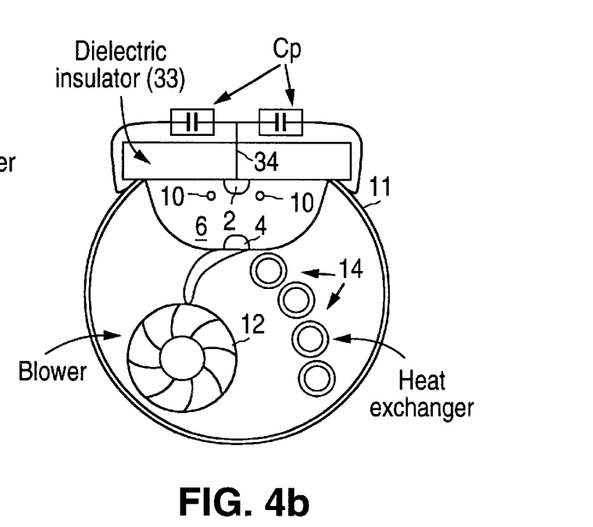
FIG. 4b illustrates in a cross sectional view a laser tube including an electrode chamber and a gas flow vessel, wherein the high voltage electrode is insulated by a dielectric plate, and the discharge area is immersed in the gas flow vessel.
Figure 4C:
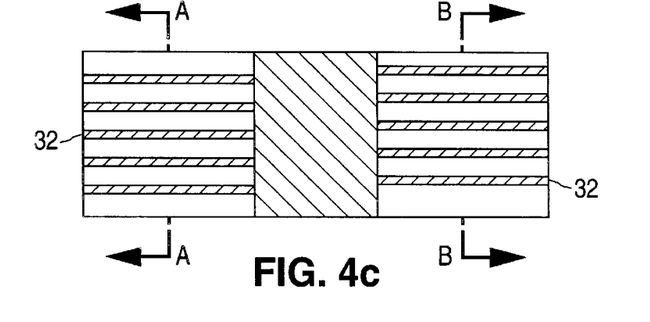
FIG. 4c illustrates in a top view low inductivity ribs crossing the gas flow and separated by openings to permit gas flow.
Figure 4D:
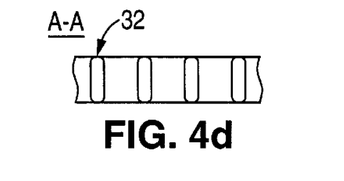
FIG. 4d illustrates a cross sectional side view of the ribs of FIG. 4c separated by openings through which gas enters the electrode chamber from the gas flow vessel.
Figure 4E:
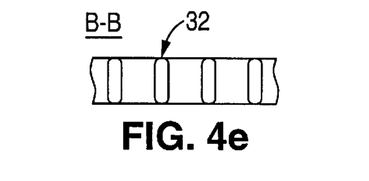
FIG. 4e illustrates a cross sectional side view of the ribs of FIG. 4c separated by openings through which gas exits the discharge chamber and flows back into the gas flow vessel.

FIG. 4b shows an alternative discharge unit design to that illustrated at FIG. 4a (see U.S. Pat. No. 4,891,818 to Levatter and 5,771,258 to Morton et al.). A dielectric insulator plate 33 separates the high voltage electrode from the metal walls of the electrode chamber. The main electrodes 2, 4 are immersed in the gas flow vessel 11. Electrical current return bars similar to the rectangular ribs 32 of the arrangement of FIG. 4a may once again cross the gas flow and shorten the discharge loop from the grounded discharge electrode 4 to the walls of the laser tube. The gas exchange conditions are improved over those discussed above with respect to the arrangement of FIG. 4a.

The improved gas exchange conditions provided by the arrangement of FIG. 4b are advantageous because satisfactory laser operation may be achieved at lower gas flow rates, and strong and uniform gas flow permits satisfactory operation at higher repetition rates (see U.S. Pat. No. 5,247,534 to Muller-Horsche, assigned to the same assignee as the present invention, and hereby incorporated by reference). However, the connection of the high voltage electrode 2 via the dielectric plate 33 implies the use of a plurality of concentrated feedthroughs 34. This gives rise to an undesirably higher inductivity of the electrical discharge current loop.

Figure 10:
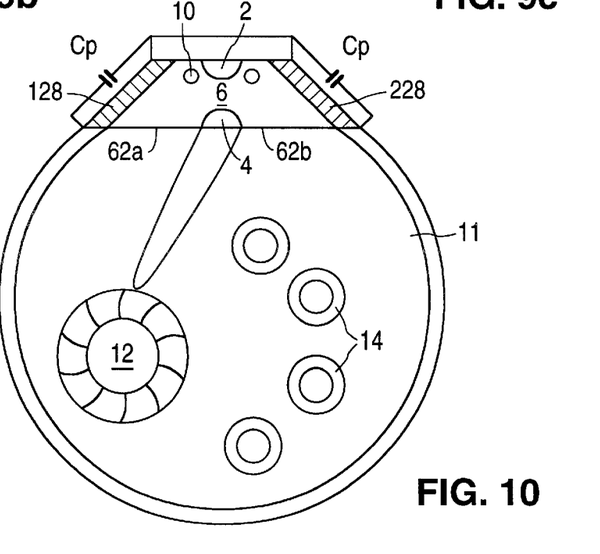
FIG. 10 illustrates a laser having an electrode chamber configuration in accord with an alternative embodiment of the present invention.

FIG. 10. shows an alternative design. The insulators 128 shown in FIG. 10 conform with the gas flow.

Another consideration of discharge unit design is the main electrodes 2, 4 themselves. Features of the main electrodes 2, 4 including their size, shape and proximity to each other and to other elements within the electrode chamber such as the preionization units determine important discharge conditions such as the shape and uniformity of the static electrical field in the discharge area 6 and the width of the discharge area 6.

In line narrowed lasers, used as illuminating sources for microlithography, some additional considerations amplify the desirability of minimizing the discharge width. One of these is the design of the resonator assembly. The discharge width should be reduced to a value commensurate with the effective aperture size of the line narrowing resonator. For example, an effective aperture of a line width narrowing resonator might be on the order of 3 to 4 mm or less, and is typically around 2 mm. Thus, the discharge width should be comparable to or less than this 3 to 4 mm specification.

A narrower discharge width is also more suitable for laser operation at higher repetition rates (e.g., 1 kHz or more). Yet another advantage to having a narrow discharge width is that the exchange of gases in the discharge area is simplified.

In combination with design considerations involving the static field and discharge width parameters as discussed above, the electrodes 2, 4 should have a minimized width to provide the most compact and least inductive design possible of the gas discharge electrical circuit. Analytical expressions for the shapes of the electrodes 2, 4 have been proposed including a combination of implicit hyperbolic functions (see T. Y. Yang, Improved Uniform-Field Electrode Profiles for TEA Laser and High-Voltage Applications, The Review of Scientific Instruments, vol. 41, no. 4 (April 1973); G. J. Ernst, Uniform-Field Electrodes with Minimum Width, Optics Communications, vol. 49, no. 4 (March 15, 1984); G. J. Ernst, Compact Uniform-Field Electrode Profiles, Optics Communications, vol. 47, no. 1 (Aug. 1, 1983)), and as a solution of a system of ordinary differential equations (see E. A. Stappaerts, A Novel Analytical Design Method for Discharge Laser Electrode Profiles, Appl. Phys. Lett., 40(12) (Jun. 15, 1982)).

Typical approaches usually propose the electrodes 2, 4 to be identical, each having a uniform regular shape with a minimal gap between the middle portions of the electrodes 2, 4 and a gradually increasing gap away from the middle portions to the edges. During laser operation, the discharge will begin in these middle portions. The real width of the gas discharge is also less than the width of the electrodes 2, 4. For example, the discharge width might be 11 mm while the width of each electrode 2, 4 is around 30 mm. The actual discharge width depends on many factors including the gas mixture, the preionization technique used, the electrical circuitry and the static electric field distribution.

The outer portions of the electrodes 2, 4, although carrying little or no discharge current, contribute significantly to the electrical field distribution in the vicinity of the discharge area 6. The fact that the outer portions of the electrodes 2, 4 carry little or no discharge current may be used advantageously for other considerations in the design of the electrodes 2, 4. For example, the outer portions of the electrodes 2, 4 may comprise dielectric materials such as ceramics to thereby prevent parasitic discharge currents and to further restrict the discharge width (see H. Bucher and H. Frowein, Elektrode fur einen Gasentladungslaser, Deutsches Patent DE 4401892 A1 (Jul. 27, 1995)).

A known design choice (see U.S. Pat. No. 5,557,629 to Mizoguchi et al. and U.S. Pat. No. 5,535,233 to Mizoguchi et al.) is to provide at least one of the electrodes 2, 4 with an elliptical shape such that the outer surface satisfies the relationship:

$$\left(\frac{x}{a}\right)^2 + \left(\frac{y}{b}\right)^2 = 1, \quad \text{where} \quad 1 < \frac{a}{b} < 4.$$

Figure 5:
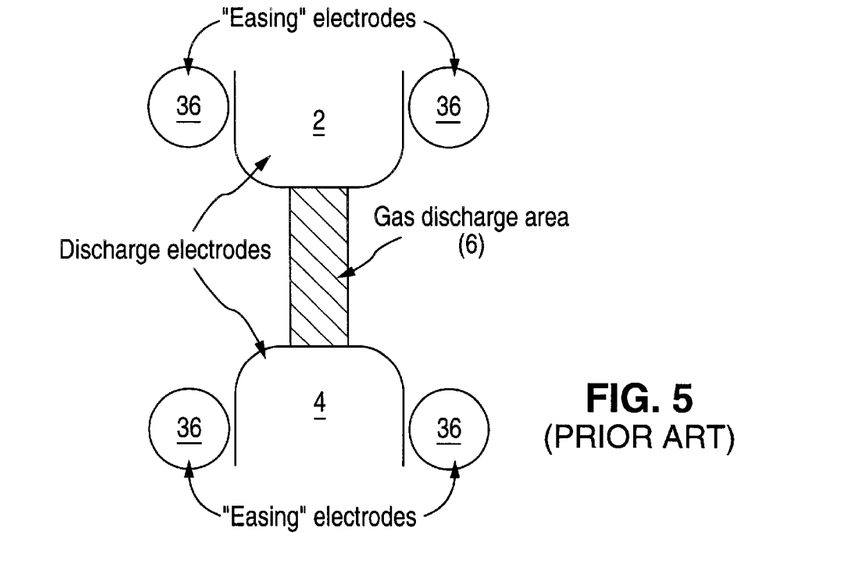
FIG. 5 illustrates a gas discharge electrode arrangement of the prior art including a pair of easing electrodes around each main discharge electrode.

Another technique disclosed in the '629 and '233 patents is shown in FIG. 5. In the design shown in FIG. 5, additional "easing" electrodes 36 are positioned on either side of the main discharge electrodes 2, 4.

SUMMARY OF THE INVENTION

It is an object of the present invention to provide an efficient discharge unit for line narrowed excimer or molecular fluorine lasers, operating at high repetition rates, such as are used as illumination sources in microlithography applications.

It is also an object of the invention to provide a discharge unit wherein the discharge circuit design including the placement of peaking capacitors Cp exhibits a low inductivity.

It is a further object of the invention to provide a discharge unit wherein gas flow conditions are optimized such that the laser gas may flow rapidly and uniformly through the discharge area between the main electrodes.

In accord with the above objects, in a first aspect of the present invention, an electrode chamber of a laser for an excimer or molecular fluorine laser is connected with a gas flow vessel, and includes a pair of elongated main electrodes separated by a discharge area, and a preionization unit. The electrode chamber also includes a spoiler integrated with the chamber and spaced from each of the main electrodes. The spoiler is shaped to provide an aerodynamic gas flow through the discharge area. A spoiler unit may include a pair of opposed spoiler elements each integrated with the chamber on either side of the discharge area, wherein each spoiler element is spaced from the main discharge electrodes and shaped to provide an aerodynamic gas flow through the discharge area.

Also in accord with the objects of the invention, in a second aspect of the present invention, a laser for an excimer or molecular fluorine laser is provided including an electrode chamber having a pair of elongated main electrodes separated by a discharge area, and a preionization unit. In the electrode chamber, at least one main electrode includes a base portion and a center portion which may be a nipple protruding from the base portion. The nipple substantially carries the periodic discharge current such that the discharge width is reduced to the width of the nipple which may be significantly less than the discharge width which would be provided by an electrode comprising only the base portion. The curvature of the base portion may be similar to the curvature of gas flow through the discharge chamber to improve aerodynamic performance.

In a third aspect of the present invention, an electrode chamber of a discharge unit for an excimer or molecular fluorine laser in accord with the above objects is connected with a gas flow vessel and includes a pair of main electrodes and a preionization unit. A plurality of ribs connected to one of the main electrodes cross the gas flow preferably between the electrode chamber and the gas flow vessel. The ribs are separated by openings to permit gas flow and shaped to provide an aerodynamic flow of gases through the openings. The shape of the ribs provides a smooth and uniform gas flow between the gas flow vessel and the electrode chamber and thus a reduced aerodynamic resistance for the blower over conventional conducting ribs. The ribs preferably have widths which smoothly taper from the end which meets the gas flow to the opposite end. The ribs may be rounded and each end may have a different radius of curvature.

In a fourth aspect of the invention, an electrode chamber of a laser for an excimer or molecular laser is connected with a gas flow vessel, and includes a pair of elongated main electrodes separated by a discharge area, and a preionization unit. The electrode chamber includes a spoiler spaced from each of the main electrodes and positioned near a preionization electrode to thereby shield the preionization electrode from one of the main electrodes. The spoiler is also shaped to provide an aerodynamic gas flow through the discharge area. A spoiler unit may include a pair of opposed spoiler elements each positioned electrode on either side of the discharge area to shield one of two or more preionization electrodes from a main electrode, wherein each spoiler element is spaced from the main discharge electrodes and shaped to provide an aerodynamic gas flow through the discharge area.

In a fifth aspect of the invention, an electrode chamber of a laser for an excimer or molecular laser is connected with a gas flow vessel, and includes a pair of elongated main electrodes separated by a discharge area, and a preionization unit. The electrode chamber includes a spoiler shaped to reflect acoustical waves emanating from the discharge area into the gas flow. The spoiler is also shaped to provide an aerodynamic gas flow through the discharge area. A spoiler unit may include a pair of opposed spoiler elements positioned on either side of the discharge area shaped to reflect acoustical waves emanating from the discharge area into the gas flow vessel, wherein each spoiler element is shaped to provide an aerodynamic gas flow through the discharge area.

Combinations of two or more of the features described above and below are also anticipated in the present invention. For example, a discharge chamber in accord with one, more than one or all three of the above aspects would be in accord with the present invention.

DETAILED DESCRIPTION OF THE PREFERRED EMBODIMENT

Figure 6:
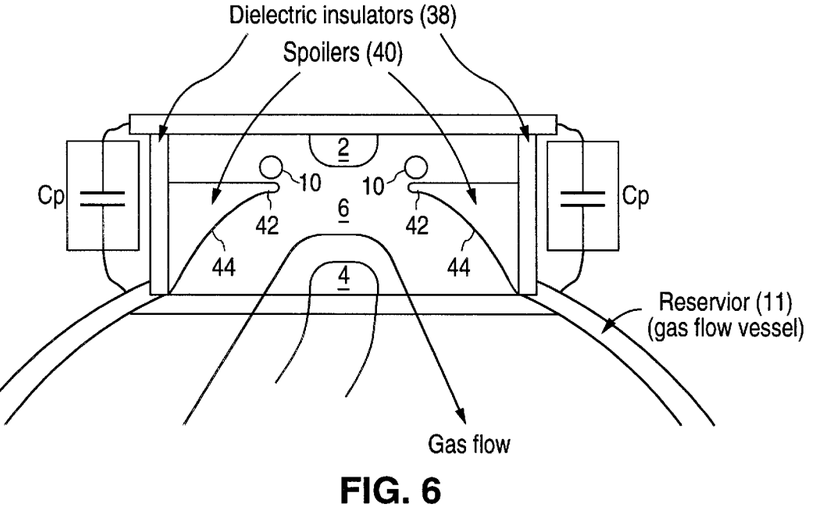
FIG. 6 illustrates a laser having an electrode chamber in accord with first, fourth and fifth aspects of the present invention.

FIG. 6 shows an aerodynamic discharge unit in accord with a first aspect of the present invention. The discharge unit of FIG. 6 includes a pair of main electrodes 2, 4 separated by a discharge area 6 and connected with a set of peaking capacitors Cp. A pair of preionization units 10 are also shown and preferred. There may be only a single preionization unit or more than two. Preferred preionization units are described at U.S. patent applications Ser. No. 09/247,887, 60/160,182 and 60/162,845, each of which is assigned to the same assignee, and at U.S. Pat. No. 5,337, 330 and 5,719,896, all of which are hereby incorporated by reference.

The discharge unit includes one or more dielectric insulators 38 preferably having a similar design as the dielectric insulators 28 discussed above with respect to FIG. 4a. The dielectric insulators 38 of the preferred embodiment may also be curved, e.g., to provide a more aerodynamic electrode chamber. The insulators 38 may also be straight, but tilted such as to form a trapezoidally shaped electrode chamber (see FIG. 10, below).

In contrast with FIG. 4a, a pair of preferred spoilers 40 in accord with the present invention are shown in FIG. 6. The spoilers 40 are preferably integrated with the chamber at the dielectric insulators on either side of the discharge area 6. The spoilers 40 may be integrated parts of a single unit, single material dielectric assembly with the insulators 38, or they may comprise different materials suited each to their particular functions. That is, the spoilers 40 and the dielectric insulators 38 may be formed together to provide an aerodynamic electrode chamber for improved gas flow uniformity and in accord with other features of the spoilers to be described below. Alternatively, the spoilers 40 may be attached to the insulating members 38.

The spoilers 40 are shaped and positioned for aerodynamic and uniform gas flow as the gas flows through the electrode chamber from the gas flow vessel 11 (partially shown), through the discharge area 6 and back into the gas flow vessel 11. Preferably, the spoilers 40 are symmetric in accord with a symmetric discharge chamber design.

One end 42 of each of the spoilers 40 is preferably positioned to shield a preionization unit 10 from the main electrode 4, and is shown in FIG. 6 extending underneath one of the pre-ionization units 10 between the preionization unit 10 and the main electrode 4. These ends 42 of the spoilers 40 are preferably positioned close to the preionization units 10. For example, the ends 42 may be just a few millimeters from the preionization units 10. By shielding the preionization units 10 from the main electrode 4, arcing or dielectric breakdown between the preionization units 10 and the main electrode 4 is prevented.

The spoilers 40 serve to remove gas turbulence zones present in conventional discharge unit electrode chambers which occur due to the sharp curvature of the gas flow in the vicinity of the preionization units 10 and of the grounded discharge electrode 4.

Another advantageous function of the spoilers 40 according to the present invention is to reduce the level of acoustical disturbances within the discharge chamber. The spoilers 40 serve as "mirrors" to reflect the acoustical disturbances into the gas flow vessel 11 (partially shown here). Thus, shock waves propagating outwardly from the discharge area 6 impinge upon the oblique surfaces 44 of the spoilers 40 and reflect into the gas flow vessel 11. Referring back to FIG. 3, internal components of the gas flow vessel 11, such as the heat exchanger 14 and the blower 12, then efficiently damp the acoustical waves.

This additional function of the spoilers 40 in accord with the present invention reduces the level of the acoustical disturbances discussed above with respect to the electrode chamber of FIG. 4a. Thus, additional acoustical dampers are not used and the adverse impact on gas flow uniformity of using conventional dampers is avoided.

Figure 7A:
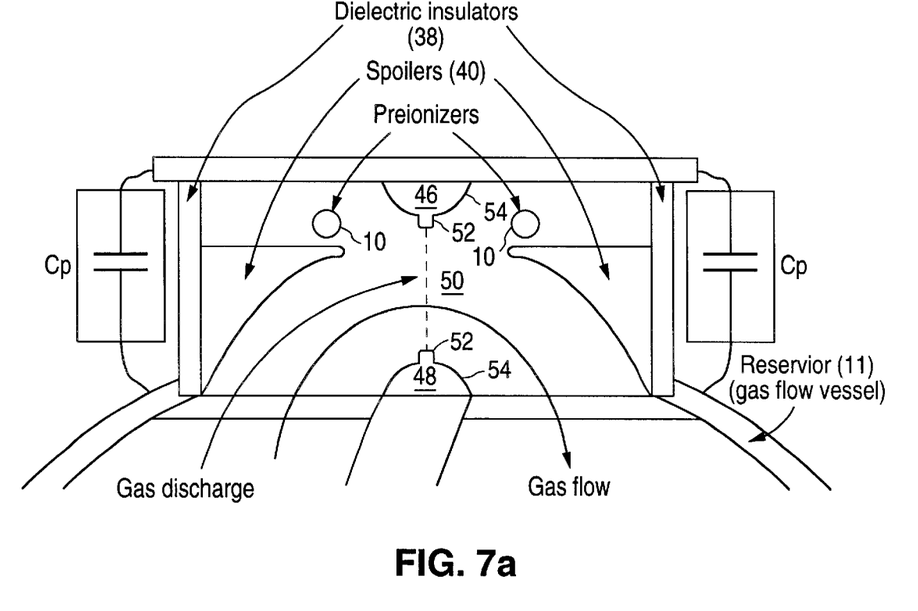
FIG. 7a illustrates a laser having an electrode chamber in accord with a second aspect of the present invention.

FIG. 7a illustrates a second aspect of the present invention relating to the shape of the main discharge electrodes 46, 48. As noted above, the shapes of the discharge electrodes 46, 48 significantly effect characteristics of the discharge area 50. In accord with the preferred embodiment which incorporates the second aspect of the present invention, at least one, and preferably both, of the electrodes 46, 48 includes two regions. One of these regions, the center portion 52, substantially carries the discharge current and provides a uniform and narrow gas discharge width. The other region, or base portion 54, in collaboration with other conductive and dielectric elements within the discharge chamber, as discussed above, creates preferred electrical field conditions in and around the discharge area 50 and also contributes to the smoothness and uniformity of the gas flow in the vicinity of the discharge electrodes 46, 48.

The center portion 52 and base portion 54 preferably form an electrode 46 having a single unit construction, and composed of a single material. The center and base portions 52, 54 may also comprise different materials, but the different materials should have compatible mechanical and thermal properties such that mechanical stability and electrical conductivity therebetween is sufficiently maintained. The center portion 52 and the base portion 54 come together at a discontinuity or irregularity in the shape of the electrodes 46, 48. A significant deviation of the electrical field occurs at the location of the irregularity in such a way that gas discharge occurs substantially from/to the center portions 52.

The center portion 52 is shaped to provide a uniform gas discharge having a narrow width. The shape of a preferred center portion 52 is described by the formula:

$$\left(\frac{x}{a}\right)^m + \left(\frac{y}{b}\right)^n = 1, \quad (1)$$

where $m+n \geq 5$.

Experiments performed using electrodes 46 and 48 having center portions shaped according to formula (1) have shown improved uniformity and width characteristics over center portions 52 having $m=n=2$ (see U.S. Pat. Nos. 5,557,629 and 5,535,233, above).

More specific details of the preferred electrodes 46, 48 are provided below. The base portions 54 of the main electrodes 46, 48 have a width around 30 mm. The interelectrode gap is preferably 14 to 16 mm. The middle area has a width around 2 mm. The center portions 52 have a shape preferably as follows:

$$\left(\frac{x}{1}\right)^3 + \left(\frac{y}{0.85}\right)^3 = 1, \text{ - high voltage electrode 46,} \quad (2)$$

$$\left(\frac{x}{a}\right)^m + \left(\frac{y}{b}\right)^n = 1, \text{ - ground electrode 48, where} \quad (3)$$

where x and y are in millimeters, y is in the direction of the interelectrode gap, x is orthogonal to y and is in the plane of the cross section of the discharge chamber shown in FIG. 7, m is preferably between 0.5 and 3, n is preferably between 8 and 13, a is preferably between 0.5 and 1.5, and b is preferably between 0.2 and 0.8. The parameters of the shape of the center portion 52 of the high voltage electrode 46 may be in a range around the specific values given above. Qualitatively speaking, the center portions 52 have a reduced curvature at their tips than those described above having $m=n=2$.

The base portions 54 have smooth, regular shapes. The center portions 52 are positioned between the base portions 54 and the discharge area 50. As discussed above, the base portions 54 are shaped to provide a desired electric field distribution in and around the discharge area 50. In addition and in combination with the shape and positioning of the dielectric spoilers 40 and the preionization units 10, the base portions 54 of the electrodes 46, 48 provide an aerodynamic channel for the flowing laser gas. For example, the base portions 46, 48 may be shaped according to any of a variety of smooth curves or a combination of several smooth curves including those described by circular, elliptical, parabolic, or hyperbolic functions. The curvatures of the base portions 54 of the electrodes 46 and 48 may be the same or different, and have the same direction of curvature with respect to the discharge area 50, i.e., the base portions 54 each curve away from the discharge area 50 away from the center portion 52.

Figure 7B:
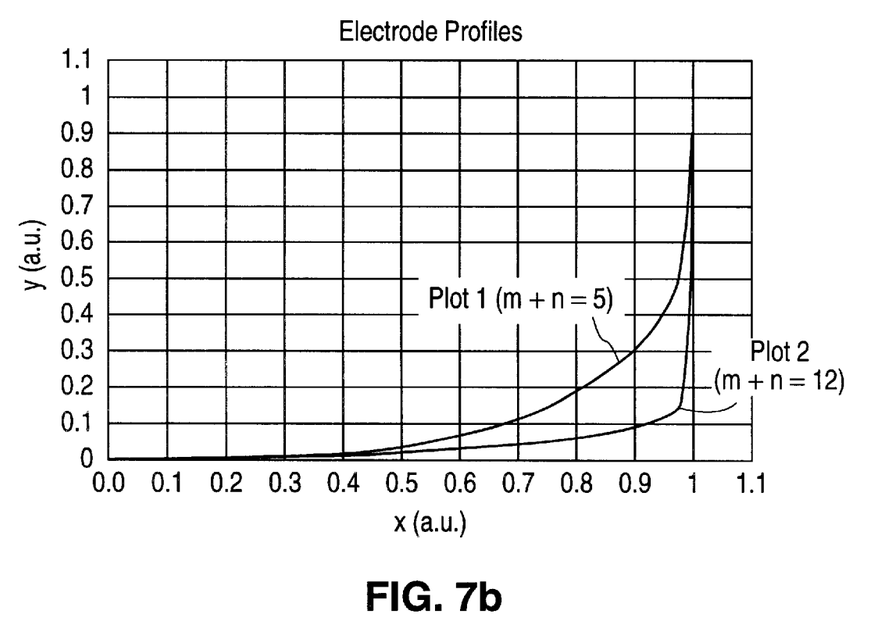
FIGS. 7b–c illustrates profiles of the preferred center portions of the electrodes.
Figure 7C:
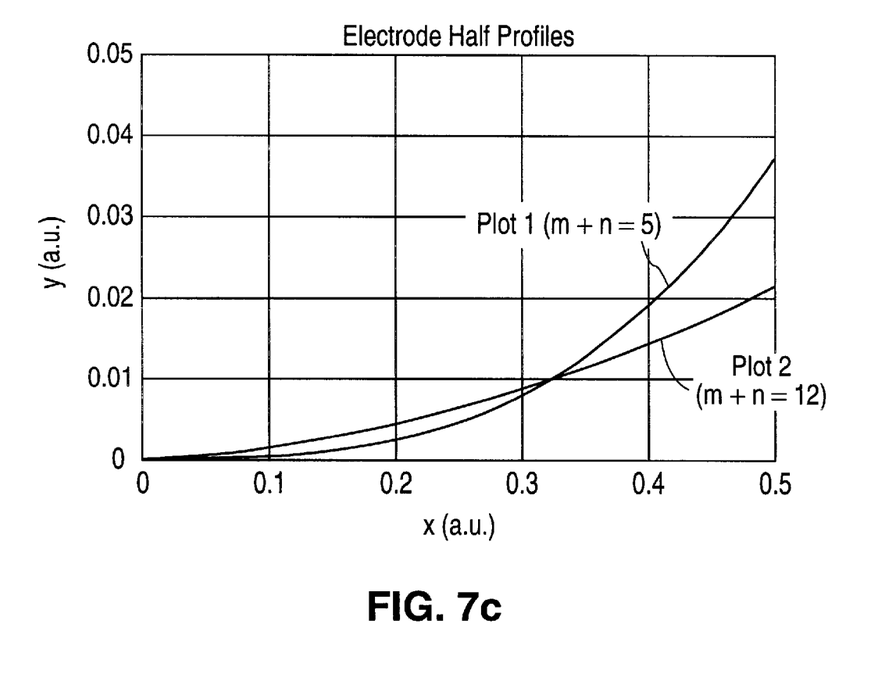

FIG. 7b shows profiles of preferred center portions 52. In plot 1, $m+n=5$ and in plot 2, $m+n=12$. FIG. 7c shows half profiles of the preferred center portions of FIG. 7b.

Figure 7D:
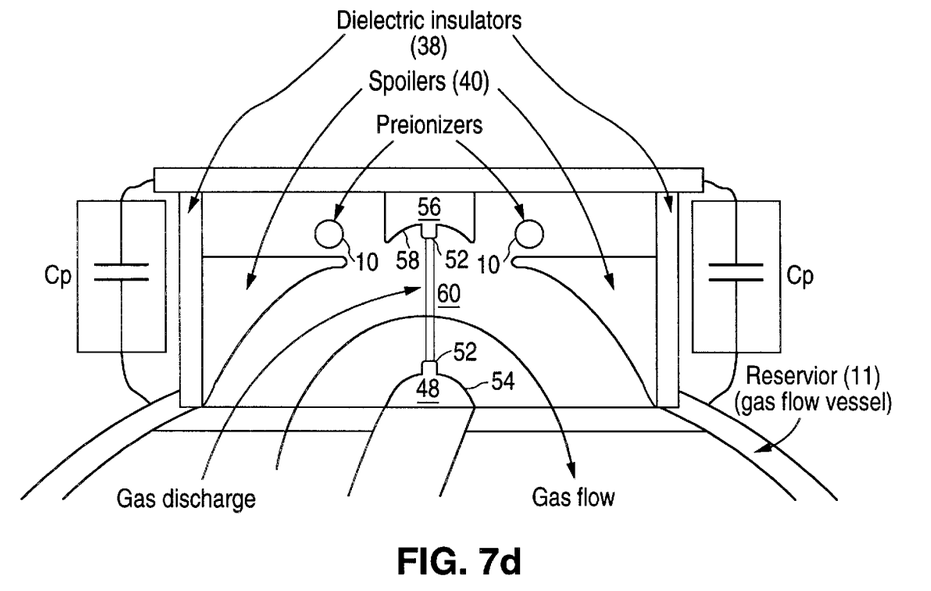
FIG. 7d illustrates a laser having an alternative electrode chamber in accord with the second aspect of the present invention.

An alternative configuration in accord with the second aspect of the present invention is shown in FIG. 7d. The discharge chamber of FIG. 7d is preferably the same as that shown and described with respect to FIG. 7a, except that the base portion 58 of the high voltage main electrode 56 of FIG. 7d has opposite curvature to the base portion 54 of the electrode 46 shown in FIG. 7a. That is, the base portion 58 of the electrode 56 curves toward the discharge area 60 away from its corresponding center portion 52, while the base portion 54 of the electrode 48 curves away from the discharge area 60 away from its corresponding center portion 52. The alternative configuration shown in FIG. 7d provides an even more aerodynamic channel for gas flow through the discharge area 60.

Figure 8:
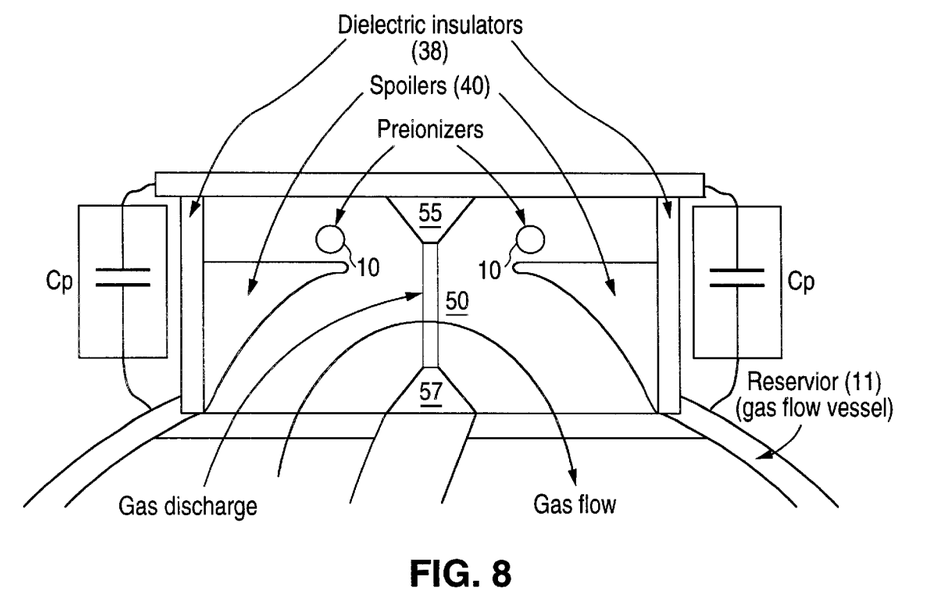
FIG. 8 illustrates a laser having another alternative electrode chamber in accord with the second aspect of the present invention.

FIG. 8 illustrates another alternative configuration of the main electrodes in accord with the second aspect of the present invention. The electrodes 55, 57 have a regular shape and no discontinuity between base and center portions. The shape of the center portions of the electrodes 55, 57 is preferably similar to that described above with respect to FIG. 7a. The base portions taper to the center portions in a triangular shape where the apexes of the triangular shaped electrodes are the center portions and are rounded as described above.

Figure 9A:
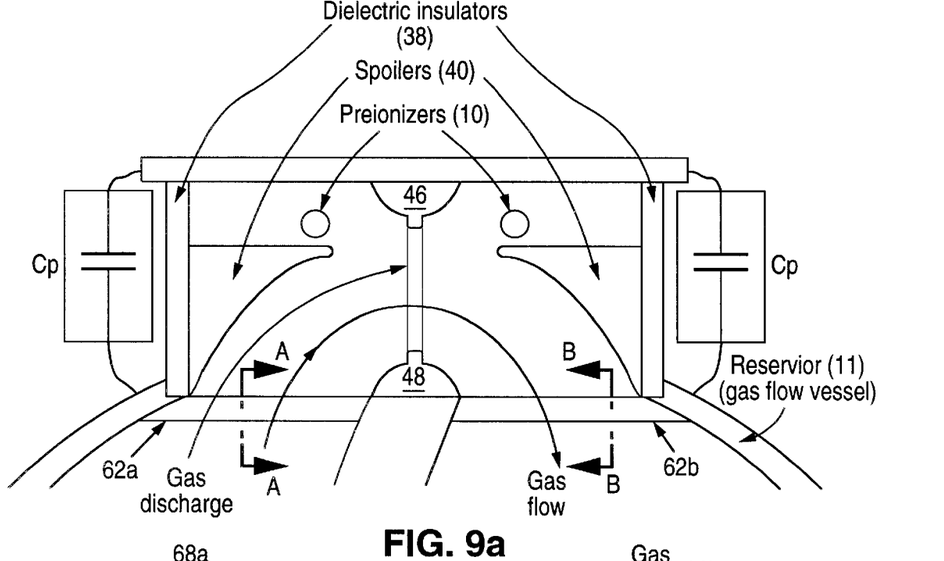
FIG. 9a illustrates a laser tube is accord with a third aspect of the present invention.
Figure 9B:
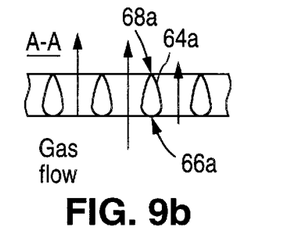
FIG. 9b shows a cross sectional view of the ribs crossing the gas flow of the laser tube of FIG. 9a where the gas flows into the electrode chamber from the gas flow vessel, wherein the ribs are separated by openings to permit the gas flow and shaped to provide aerodynamic gas flow and the ribs further serve as low inductivity current return bars.
Figure 9C:
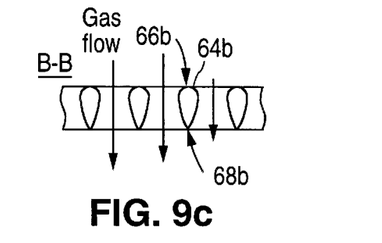
FIG. 9c shows a cross sectional view of the ribs crossing the gas flow of FIG. 9a separated by openings to permit gas flow from the electrode chamber back into the gas flow vessel, wherein the ribs are aerodynamically shaped and separated by openings through which gas exits the electrode chamber and flows back into the gas flow vessel.

FIGS. 9a–9c illustrate a third aspect of the present invention. As discussed above, the dielectric insulators 38 of the electrode chamber isolate the high voltage main electrode 46. The gas flow is crossed by a first rib configuration 62a where the gas flow enters the electrode chamber from the gas flow vessel 11 and by a second rib configuration 62b where the gas flow exits the electrode chamber and returns the gas back into the gas flow vessel 11. The ribs 62a, 62b, or current return bars, are separated by openings for the laser gas to flow into and out of the electrode chamber from/to the gas flow vessel 11. The ribs are preferably rigid and conducting, and are connected to the grounded main discharge electrode 48 to provide a low inductivity current return path. The conducting ribs 64a of the rib configuration 62a are preferably substantially shaped as shown in FIG. 9b. The conducting ribs 64b of the rib configuration 62b are preferably substantially shaped as shown in FIG. 9c. The ribs 64a and 64b of the rib configurations 62a and 62b, respectively, are asymmetrically shaped. In contrast, the ribs 32 shown in cross-section in FIGS. 4d and 4e are rectangularly shaped.

FIG. 9b is a cross sectional view of the rib configuration 62a through which the laser gas enters the electrode chamber from the gas flow vessel 11. The ribs 64a of the rib configuration 62a each have a wide end 66a which meets the laser gas as it flows from the gas flow vessel 11, and a narrow end 68a past which the laser gas flows as it enters the discharge chamber. Preferably, the ribs 64a are smoothly tapered, e.g., like an airplane wing, from the wide, upstream end 66a to the narrow, downstream end 68a to improve gas flow past the rib configuration 62a.

FIG. 9c is a cross sectional view of the rib configuration 62b through which the laser gas exits the electrode chamber and flows back into the gas flow vessel 11. The ribs 64b of the rib configuration 62b each have a wide end 66b which meets the laser gas as it flows from the electrode chamber, and a narrow end 68b past which the laser gas flows as it enters the gas flow vessel 11. Preferably, the ribs 64b are smoothly tapered, e.g., like an airplane wing, from the wide, upstream end 66b to the narrow, downstream end 68b to improve gas flow past the rib configuration 62b.

The aerodynamic ribs 64a and 64b each provide a reduced aerodynamic resistance to the flowing gas from that provided by the conventional rectangular ribs 32 of FIGS. 4d and 4e. The ribs 64a and 64b are thus shaped to improve the uniformity of the gas flow in accord with the above objects of the invention. A more homogeneous gas flow results from modifying the conventional ribs 32 into the ribs 64a, 64b of the present invention. The more homogeneous gas flow results in a more homogeneous gas density in the discharge area. The more homogeneous gas density in the discharge area results in a more homogeneous and stable discharge, ultimately and advantageously providing more stable output beam parameters.

FIG. 10 illustrates an electrode chamber in accord with an alternative embodiment of the present invention. The laser tube shown includes an electrode chamber and a gas vessel 11. The electrode chamber has a pair of main electrodes 2, 4 separated by a discharge area 6, and one or more (two are shown) preionization electrodes 10. The electrodes 2, 4 are connected to peaking capacitors Cp. The current return rib configurations 62a and 62b are preferably as shown and described above with respect to FIGS. 9a–9c. The gas flow vessel 11 has a blower 12 and heat exchanger 14 also as described above.

The high voltage main electrode 2 is isolated by a dielectric frame 128 that differs from that discussed above. The frame 128 has opposing walls inclined toward each other near the electrode 2 which is furthest from the gas flow vessel 11. That is, the frame does not form a rectangular electrode chamber such as that shown in FIG. 4a. Neither is the electrode chamber sunk into the gas flow vessel 11 like that shown in FIG. 4b. Instead, the frame 128 shown is configured such that the electrode chamber forms a trapezoidal shape.

The shape of the dielectric frame 128 is advantageous because in addition to isolating the main electrode 2, the frame 128 provides a more uniform flow of the gas mixture through the discharge area 6. In addition, acoustic waves generated in the discharge area are reflected from the frame 128 and into the gas flow vessel 11, where the acoustic waves are preferably absorbed by the gas flow components 12 and 14. The frame 128 may be configured to absorb some of the acoustic waves, as well. Although not shown, spoilers may be added similar to those shown and described at FIG. 6. The spoilers may be integrated with the frame 128. The spoilers may be shaped to provide a still more uniform gas flow, and to inhibit dielectric breakdown between the preionization unit(s) 10 and the main electrode 4. The spoilers may also serve to further dampen and/or reflect acoustic waves emanating from the discharge area 6.

It is anticipated that a discharge chamber in accord with the preferred or alternative embodiments and any of the aspects described above in accord with the present invention will be particularly advantageous for use with an excimer or molecular fluorine laser. For example, a KrF laser would have a gas mixture including Kr, $F_2$ and Ne and optionally a Xe or Ar additive. An ArF laser would have a gas mixture of Ar, $F_2$ and Ne and/or He, and optionally a Xe or Kr additive. A $F_2$ laser would a gas mixture of $F_2$ and Ne and/or He. A XeCl, XeF or KrCl laser would also benefit with the advantages described above. Preferred gas mixtures and gas control techniques are described at U.S. patent applications Nos. 60/124,785, 09/418,052, 60/159,525, 09/379,034, 60/160,126, 09/317,526, and 60/127,062, and U.S. Pat. No. 4,393,505, 5,396,514 and 4,977,563, each of which is a assigned to the same assignee as the present application, and U.S. Pat. No. 5,978,406, all of which are hereby incorporated herein by reference.

The specific embodiments described in the specification, drawings, summary of the invention and abstract of the disclosure are not intended to limit the scope of any of the claims, but are only meant to provide illustrative examples of the invention to which the claims are drawn. The scope of the present invention is understood to be encompassed by the language of the claims, and structural and functional equivalents thereof.

What is claimed is:

1. An excimer or molecular fluorine laser, comprising:
   an electrode chamber connected with a gas flow vessel defining a laser tube having a laser gas mixture therein, the laser gas mixture at least including a halogen-containing species and a buffer gas;
   a pair of elongated main electrodes in the electrode chamber separated by a discharge area;
   a preionization unit in the electrode chamber for generating ultraviolet radiation to ionize the gas mixture prior to main electrode discharges;
   a discharge circuit for energizing the gas mixture;
   a resonator for generating a laser beam; and
   a spoiler comprising halogen corrosion-resistant ceramic and shaped to provide an uniform gas flow through the discharge area; and
   wherein the spoiler is positioned to inhibit dielectric breakdown between the preionization unit and at least one of the main electrodes while allowing the ultraviolet radiation generated by the preionization unit to propagate through to the discharge area and ionize the gas mixture therein.

2. An excimer or molecular fluorine laser, comprising:
   an electrode chamber connected with a gas flow vessel defining a laser tube having a laser gas mixture therein;
   a pair of elongated main electrodes in the electrode chamber separated by a discharge area;
   a preionization unit in the electrode chamber for generating ultraviolet radiation to ionize the gas mixture prior to main electrode discharges;
   a discharge circuit for energizing the gas mixture;
   a resonator for generating a laser beam; and
   a spoiler comprising halogen corrosion-resistant ceramic and integrated with the chamber, said spoiler being spaced from each main electrode and shaped to provide an uniform gas flow through the discharge area,
   wherein the spoiler is positioned to inhibit dielectric breakdown between the preionization unit and at least one of the main electrodes while allowing the ultraviolet radiation generated by the preionization unit to propagate through to the discharge area and ionize the gas mixture therein.

3. The laser of any of claims 1 or 2, wherein the spoiler is positioned in close proximity to the preionization unit.

4. The laser of any of claims 1 or 2, wherein the spoiler is further shaped to dampen acoustic waves generated in the discharge area.

5. The laser of claim 4, wherein the spoiler is further shaped to reflect acoustic waves generated in the discharge area into the gas flow vessel to be absorbed by gas flow components therein.

6. The laser of any of claims 1 or 2, wherein the spoiler is further shaped to reflect acoustic waves generated in the discharge area into the gas flow vessel to be absorbed by gas flow components therein.

7. The laser of claim 6, wherein the spoiler includes two opposed spoiler elements having the discharge area therebetween.

8. The laser of claim 1, wherein the spoiler includes two opposed spoiler elements having the discharge area therebetween.

9. The laser of claim 2, wherein the spoiler includes two opposed spoiler elements having the discharge area therebetween.

10. An excimer or molecular fluorine laser, comprising:
an electrode chamber connected with a gas flow vessel defining a laser tube having a gas mixture therein;
a pair of elongated main electrodes in the electrode chamber separated by a discharge area;
a preionization unit in the electrode chamber for generating ultraviolet radiation to ionize the gas mixture prior to main electrode discharges;
a discharge circuit for energizing the gas mixture;
a resonator for generating a laser beam; and
a spoiler unit comprising halogen corrosion-resistant ceramic and including a pair of opposed spoiler elements shaped to provide an aerodynamic gas flow through the discharge area,
wherein the spoiler is positioned to inhibit dielectric breakdown between the preionization unit and at least one of the main electrodes while allowing the ultraviolet radiation generated by the preionization unit to propagate through to the discharge area and ionize the gas mixture therein.

11. An excimer or molecular fluorine laser, comprising:
an electrode chamber connected with a gas flow vessel defining a laser tube having a gas mixture therein;
a pair of elongated main electrodes in the electrode chamber separated by a discharge area;
a preionization unit in the electrode chamber for generating ultraviolet radiation to ionize the gas mixture prior to main electrode discharges;
a discharge circuit for energizing the gas mixture;
a resonator for generating a laser beam; and
a spoiler unit comprising halogen corrosion-resistant ceramic and including a pair of opposed spoiler elements integrated with the housing and having the discharge area therebetween, each spoiler element being spaced from each main electrode and shaped to provide an aerodynamic gas flow through the discharge area,
wherein the spoiler unit is positioned to inhibit dielectric breakdown between the preionization unit and at least one of the main electrodes while allowing ultraviolet radiation generated by the preionization unit to propagate through to the discharge area and ionize the gas mixture therein.

12. The laser of any of claims 10 or 11, wherein the spoiler elements are further shaped to reflect acoustic waves generated in the discharge area into the gas flow vessel to be absorbed by gas flow components therein.

13. The laser of claim 10, wherein the spoiler elements are further shaped to reflect acoustic waves generated in the discharge area into the gas flow vessel to be absorbed by gas flow components therein.

14. The laser of any of claims 1 or 10, wherein the electrode chamber is filled with a gas mixture including krypton, fluorine and neon.

15. The laser of any of claims 1 or 10, wherein the electrode chamber is filled with a gas mixture including argon, fluorine and one of neon and helium.

16. The laser of any of claims 1 or 10, wherein the electrode chamber is filled with a gas mixture including fluorine and one of neon and helium.

17. The laser of any of claims 1 or 10, wherein the electrode chamber is filled with a gas mixture including xenon, one of fluorine and HCl, and one of neon and helium.

18. An excimer or molecular fluorine laser, comprising:
an electrode chamber connected with a gas flow vessel defining a laser tube having a gas mixture therein;
a pair of elongated main electrodes in tile electrode chamber separated by a discharge area;
a preionization unit in the electrode chamber for generating ultraviolet radiation to ionize the gas mixture prior to main electrode discharges;
a discharge circuit for energizing the gas mixture;
a resonator for generating a laser beam; and
a spoiler in the electrode chamber comprising halogen corrosion-resistant ceramic and shaped to provide more uniform gas flow through the discharge area and positioned to inhibit dielectric breakdown between the preionization unit and at least one of the main electrodes while allowing ultraviolet radiation generated by the preionization unit to propagate through to the discharge area and ionize the gas mixture therein.

19. The laser of claim 18, wherein the spoiler is positioned in close proximity to the preionization unit.

20. The laser of any of claims 18 or 19, or wherein the spoiler is further shaped to dampen acoustic waves generated in the discharge area.

21. The laser of any of claim 18 or 19, wherein the spoiler is further shaped to reflect acoustic waves generated in the discharge area into the gas flow vessel to be absorbed by one or more gas flow components.

22. The laser of claim 18, wherein the spoiler includes two opposed spoiler elements having the discharge area therebetween.

23. An excimer or molecular fluorine laser, comprising:
an electrode chamber connected with a gas flow vessel defining a laser tube having a gas mixture herein;
a pair of elongated main electrodes in the electrode chamber separated by a discharge area;
a preionization unit in the electrode chamber for generating ultraviolet radiation to ionize the gas mixture prior to main electrode discharges;
a discharge circuit for energizing the gas mixture;
a resonator for generating a laser beam; and
a spoiler in the electrode chamber comprising halogen corrosion-resistant ceramic and smoothly shaped to conform the gas flow through the discharge area and to reflect acoustic waves generated in the discharge area into the gas flow vessel to be absorbed by one or more components of the gas flow vessel,
wherein the spoiler is positioned to inhibit dielectric breakdown between the preionization unit and at least one of the main electrodes while allowing the ultraviolet radiation generated by the preionization unit to propagate through to the discharge area and ionize the gas mixture therein.

24. The laser of claim 23, wherein the spoiler is positioned in close proximity to the preionization unit.

* * * * *